G. S. TIFFANY.
AZIMUTH AND OTHER INDICATOR.
APPLICATION FILED MAR. 15, 1912.
1,156,113.
Patented Oct. 12, 1915.
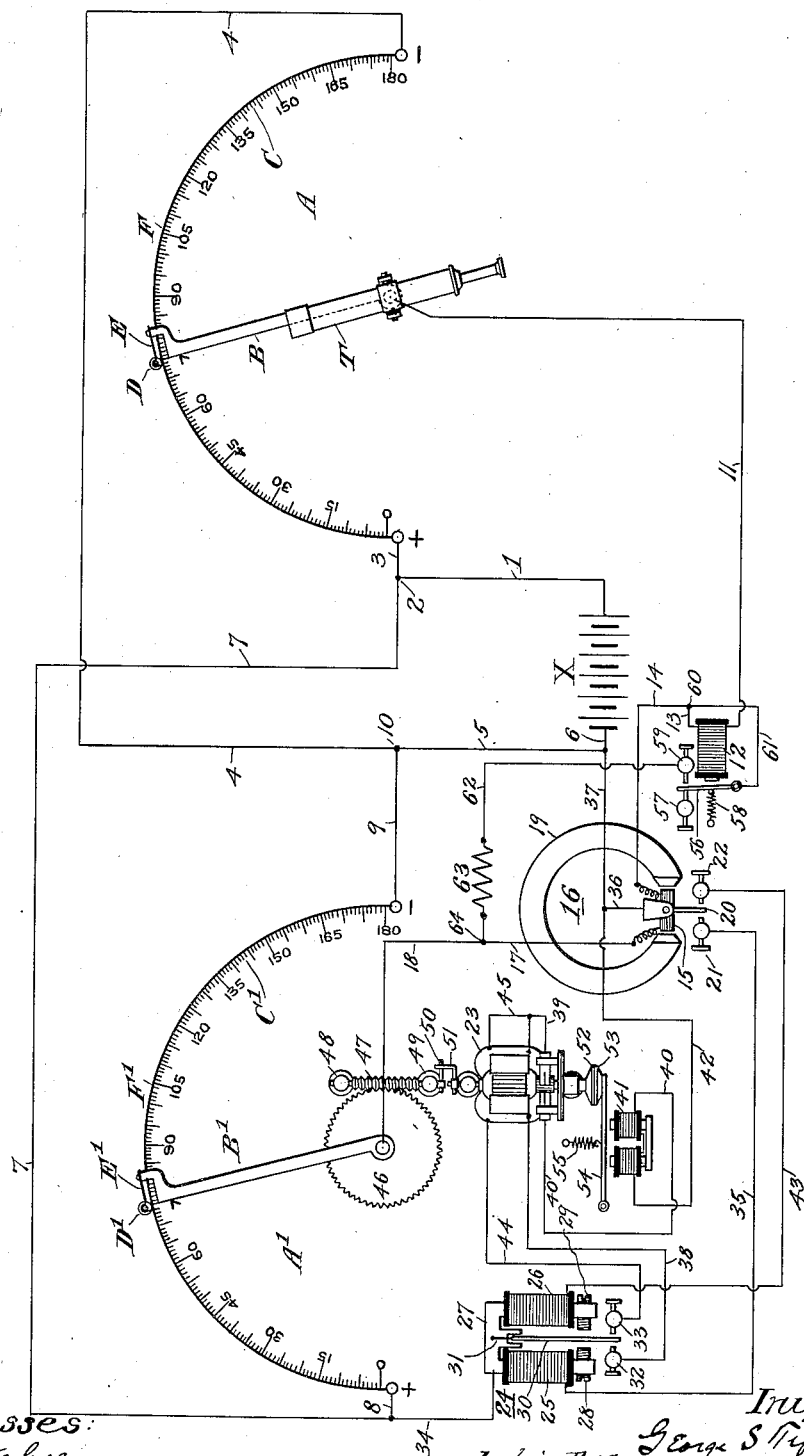

UNITED STATES PATENT OFFICE.

GEORGE S. TIFFANY, OF SUMMIT, NEW JERSEY, ASSIGNOR TO GRAY NATIONAL TELAUTOGRAPH COMPANY, OF NEW YORK, N. Y., A CORPORATION OF VIRGINIA.

AZIMUTH AND OTHER INDICATOR.

1,156,113.   Specification of Letters Patent.   Patented Oct. 12, 1915.

Application filed March 15, 1912. Serial No. 683,988.

*To all whom it may concern:*

Be it known that I, GEORGE S. TIFFANY, a citizen of the United States, residing at Summit, county of Union, and State of New Jersey, have invented certain new and useful Improvements in Azimuth and other Indicators, fully described and represented in the following specification and the accompanying drawings, forming a part of the same.

This invention relates to electrical or electro-mechanical means for contemporaneously reproducing movements at a distance, for controlling the movements of a distant member, or for producing movements in a member, which may be called the receiving member, in response to movements of another member, which may be called the transmitting member.

The invention is more particularly designed for the purpose of transmitting accurately to a distant point the motions of a pointer or telescope.

The drawing is a diagrammatic illustration of the apparatus and wiring for a single transmitting member and a single receiving member.

The preferred construction and arrangement herein shown will now be briefly described, it being understood that numerous changes and alterations may be made without departing from the invention.

The letter A designates the transmitting station and $A^1$ the receiving station. It will be understood that these "stations" may be at any appropriate distance, and that transmitting and receiving apparatus may be located adjacent each other if desired.

F and $F^1$ are conductors, preferably arcuate located at the transmitting and receiving stations respectively, and B and $B^1$ are pivoted arms or pointers carrying contacts D, $D^1$ traveling on said conductors F, $F^1$. The conductors F, $F^1$ preferably coincide with azimuth circles C, $C^1$, and the arms B, $B^1$ are pivoted at the centers of these circles. The contacts D and $D^1$ are preferably mounted on the arms by means of springs E, $E^1$; and if necessary the conductors F, $F^1$ may be immersed in oil to protect them from corrosion. The arm B carries a telescope T in parallelism therewith.

The conductors F, $F^1$ constitute corresponding parts of two circuits, which may be termed the transmitting and receiving circuits, respectively. In the particular embodiment shown X is a battery for supplying both circuits with current. The circuits may be traced from the positive pole of the battery by wire 1 to the point 2 where they branch. One branch includes the wire 3, the conductor F and wire 4. The other branch includes wires 7 and 8, conductor $F^1$ and wire 9. The two branches rejoin at 10, and thence the circuit is traced by wires 5 and 6 back to the negative pole of the battery.

The contacts D, $D^1$ are at the ends of a bridging circuit, which may be traced as follows: contact D, spring E, arm B, wire 11, coil of relay 12, wires 13 and 14 to coil 15 of relay 16, wires 17 and 18 to arm $B^1$ and thence by spring $E^1$ to contact $D^1$. It will be seen that this arrangement constitutes in effect, a Wheatstone bridge, of which the branches or circuits including the conductors F, $F^1$ are the arms. When the contacts D, $D^1$ are on points of equal potential in the conductors F, $F^1$ no current flows through the bridging circuit; but when the contact D is moved one way or the other, current flows in the bridging circuit of polarity dependent upon the relative displacement of the contacts D, $D^1$.

Means are provided whereby current flowing in the bridging circuit causes the arm or member $B^1$ to move in response to the movements of the member B. These means preferably comprise an electric motor for moving the arm $B^1$, and a relay controlling the motor so as to move said member in one direction or the other according to the polarity of current flowing in the bridging circuit. A relay 16 of the d'Arsonville type, comprising a magnet 19 and the coil 15 pivoted between the poles thereof is employed on account of its delicate response and its reverse operation under currents of opposite polarity. The coil 15 carries a movable contact 20, which is normally in mid-position between stationary contacts 21 and 22, pertaining to two circuits which control the movements of the motor in opposite directions. The motor is preferably a rotary, direct current motor, having two field windings of opposite effect. Such a motor is indicated at 23. Preferably a magnetic switch 24 is provided for directly controlling the motor. The said switch comprises two magnets 25, 26, the coils of which are connected to the heel iron 27. The magnets may have adjustable pole pieces 28, 29. Between them is a switch arm 30 connected to the heel iron 27 by the spring 31, which normally holds the arm 30 in mid-position between the contacts 32 and 33.

When the arm B with the contact D is moved so that current of one polarity goes through the bridging circuit, which circuit includes the coil 15 of the relay 16, the said coil is turned so that the contact arm 20 contacts with the contact 21. The circuit is then completed through the magnet 25 of the magnetic switch 24, the said circuit being traced as follows: from wire 7 by wire 34 to heel iron 27, through the coil of magnet 25, and by wire 35 to contact 21, thence through contact arm 20 and by wires 36, 37 and 6 to the negative side of the battery. The resulting energizing of magnet 25 draws the switch arm 30 against the contact 32, thereby completing a motor circuit as follows: from wire 7 and wire 34 to the heel iron 27, thence by spring 31 and switch arm 30 to contact 32, thence by wire 38 through one of the field windings of the motor 23, thence by wire 39 to one of the armature brushes, through the armature of the motor and out by the other brush, by wire 40 to the coils of magnet 41, and thence by wires 42, 37 and 6 to the negative pole of the battery. When the member B is moved in the other direction, so as to cause current of reverse polarity to flow through the bridging circuit, the coil 15 is turned so that the contact arm 20 contacts with the contact 22. This closes a circuit through the coil of magnet 26 as follows: from wire 7, by wire 34 to heel iron 27, thence through the coil of magnet 26, by wire 43 to contact 22, thence by contact arm 20, and by wires 36, 37 and 6 to the negative side of the battery. The energizing of the magnet 26 causes the switch arm 30 to move to the right against contact 33, thereby causing the motor to run in the opposite direction as by means of the following circuit: by wire 7, by wire 34 to heel iron 27, thence by spring 31 to contact arm 30, to contact 33, and thence by wire 44 through the reverse field winding of the motor 23, and thence by wire 45 and wire 39 to and through the armature by way of the brushes, and thence by wire 40, magnet 41 and wires 42, 37 and 6 to the negative side of the battery as before. In this manner the motor is caused to run in opposite directions according to the polarity of the current which may be flowing in the bridging circuit. When current ceases to flow in the bridging circuit the contact arm 20 carried by the coil 15 resumes its normal mid-position, out of contact with both of the contacts 21 and 22, in which event, the circuits of both the magnets 25 and 26 are open, and consequently the motor circuits are also open, the motor thereby ceasing to run.

The mechanical connections between the motor 23 and the member $B^1$ as shown consist of a worm wheel 46 mounted on the pivot of the arm $B^1$, a worm 47 meshing with said wheel and journaled in studs 48, 49, an arm 50 on the one shaft and an arm 51 on the shaft of the motor in which the arm 50 engages. A brake or momentum stop is also provided for bringing the member $B^1$ to rest at the exact moment when current ceases to flow through the bridging circuit or the contact arm 20 leaves its stationary contact. In the particular construction shown a friction disk 52 is mounted on the end of the shaft of the armature of the motor 23, and a coöperating friction member 53 is mounted on the armature arm 54 of the magnet 41. A spring 55 operates to bring the friction members 52, 53 into such forcible contact as to stop the motor and the arm $B^1$ promptly. The magnet 41 is in circuit with the motor, and consequently the brake is released whenever the motor is started, and is applied as soon as the motor circuits are broken.

If the telescope arm B were to be moved suddenly, or more rapidly than the motor 23 would operate the arm $B^1$, a current of such magnitude might flow through the bridging circuit as to injure the relay 16. In order to prevent this, means are provided for automatically closing a shunt, containing suitable resistance, around the coil 15, thereby dividing the current and diminishing the amount flowing through the said coil to an extent sufficient to guard against injury. The relay 12 is shown for this purpose. Its armature 56 is normally held against its back-stop 57 by a spring 58, the relations being such that the armature is not attracted by the core of the relay until current of a predetermined magnitude flows therethrough. The armature is then drawn over against the front contact 59, and a shunt is closed which may be traced as follows: from the bridging circuit at the junction 60 by way of wire 61 to armature 56, thence to contact 59, through wire 62 including the resistance 63 and rejoining the bridging circuit at the junction 64. The resistance 63 is so calculated that it reduces the current passing through the coil 15 below the danger point without diverting too much current from this coil.

What is claimed is:—

1. Means for causing a member to move in accordance with the movements of another member at a distant point, comprising a Wheatstone bridge, having movable contacts at the ends of its bridging circuit, and means, comprising a motor, a motor circuit, an electrically operated switch for controlling the motor circuit, and a relay in the bridging circuit controlling said switch, for moving one of said contacts in accordance with the movements of the other.

2 Means for causing a member to move in accordance with the movements of another member at a distant point, comprising a Wheatstone bridge, having movable contact-carrying members at the ends of its bridging circuit, a motor for moving and an electrically operated brake for stopping one of the said members, a motor circuit including the motor and brake and means, comprising an electrically operated switch and a relay in the bridging circuit controlling said switch, for controlling said motor and brake to produce movements of the said member corresponding to movements of the other member.

3. Means for contemporaneously reproducing at a distant point the pivotal movements of a body, comprising a Wheatstone bridge, pivoted contact-carrying members at the ends of its bridging circuit, and means, comprising a motor, a motor circuit, an electrically operated switch arranged to control the motor circuit, and a relay in the bridging circuit controlling said switch, for causing movements of one of said members corresponding to the movements of the other.

4. Means for contemporaneously reproducing at a distant point the pivotal movements of a body, comprising a Wheatstone bridge having arcuate conductors in its arms, pivoted members carrying contacts at the ends of the bridging circuit traveling on said arcuate conductors, and means, comprising a motor, a motor circuit, an electrically operated switch arranged to control said motor circuit, and a relay in the bridging circuit controlling said switch, for moving one of said members in accordance with the other.

5. Means for producing movements of a member by and in accordance with the movements of another member, comprising a circuit having a transmitting part, a receiving part, and a bridging part having movable contacts at its ends adapted to bridge between corresponding points in said transmitting and receiving parts of the circuit, and means, comprising a motor, a motor circuit, an electrically operated switch arranged to control the motor circuit, and a relay in the bridging part of the circuit controlling said switch, for moving one of said contacts in accordance with the other.

6. Means for producing movements of a member by and in accordance with the movements of another member, comprising a circuit having a transmitting part, a receiving part, and a bridging part having movable contacts at its ends, a motor for moving one of said contacts, a motor circuit, an electrically operated switch arranged to control the motor circuit, and a relay controlling said switch and in turn controlled by the bridging part of the circuit.

7. Means for producing movements of a member by and in accordance with the movements of another member, comprising a circuit having a transmitting part, a receiving part, and a bridging part having movable contacts at its ends, a motor for moving one of said contacts, a motor circuit and an electrically operated switch arranged to control the motor circuit for causing said motor to run in opposite directions, and a relay in the bridging part of the circuit controlling said switch and having a contact movable by currents of opposite polarity.

8. Means for producing movements of a member by and in accordance with the movements of another member, comprising a circuit having a transmitting part, a receiving part, and a bridging part having movable contacts at its ends, a motor for moving one of said contacts, circuits, and an electrically operated switch therefor, for causing said motor to run in opposite directions, and a relay comprising a magnet and a pivoted coil in the bridging part of the circuit located between the poles of said magnet, said coil carrying a contact normally in mid-position and controlling said switch and adapted to close one or other of the last-named circuits according to the polarity of the current flowing in the bridging part of the circuit.

9. Means for producing movements of a member by and in accordance with the movements of another member, comprising a circuit having a transmitting part, a receiving part, and a bridging part having movable contacts at its ends, a motor for moving one of said contacts, an electrically operated brake for stopping the movement thereof, a circuit including the motor and the brake, an electrically operated switch therefor, for operating said brake and causing said motor to run in opposite directions, and a relay in the bridging part of the circuit controlling said switch and movable by currents of opposite polarity.

10. Means for producing movements of a member by and in accordance with the movements of another member, comprising a circuit having a transmitting part, a receiving part, and a bridging part having movable contacts at its ends, a motor for moving one of said contacts, motor circuits for operating the motor in opposite directions, an electro-magnetic switch and switch circuits controlling said motor circuits, a brake for stopping the motor, a magnet for operating the brake also controlled by said switch, and a relay of the d'Arsonville type in the bridging part of the circuit controlling said switch circuits.

11. Means for producing movements of a member by and in accordance with the movements of another member, comprising a circuit having a transmitting part, a receiving part, and a bridging part having movable contacts at its ends, a motor for moving one of said contacts, an electrically operated switch therefor, a relay controlling said switch for causing said motor to operate in opposite directions according to the polarity of current in the bridging part of the circuit, said relay comprising a magnet and a pivoted coil, a shunt containing resistance around said coil and automatic means for closing it.

12. Means for producing movements of a member by and in accordance with the movements of another member, comprising a circuit having a transmitting part, a receiving part, a bridging part having movable contacts at its ends, a motor for moving one of said contacts, an electrically operated switch therefor, a relay controlling said switch for causing said motor to operate in opposite directions according to the polarity of current in the bridging part of the circuit, said relay comprising a magnet and a pivoted coil, a relay in circuit with said coil adapted to be operated by current of predetermined strength, and a shunt with resistance around the coil adapted to be closed by the last-named relay.

13. Means for producing movements of a member by and in accordance with the movements of another member, comprising a transmitting member, a receiving member, current varying means controlled by said transmitting and said receiving members, a motor for the member to be moved, an electrically operated switch for said motor, a relay operated by the currents controlled by said transmitting and receiving members, and in turn controlling said switch.

14. In an apparatus of the class described, the combination, with a Wheatstone bridge having movable contacts at the ends of its bridging circuits arranged to vary the resistances of the arms of the bridge, of a relay having its windings in the bridging circuit, a motor arranged to move one of the movable contacts of the bridging circuit, a motor circuit, an electromagnetic switch arranged to control the motor circuit, and a circuit controlled by the relay and including the electromagnetic switch.

15. In an apparatus of the class described, the combination, with a Wheatstone bridge having movable contacts at the ends of the bridge circuit arranged to vary the resistances of the bridge arms, an electric motor arranged to move one of said movable contacts, a motor circuit, an electromagnetic switch arranged to control the motor circuit, a brake arranged to brake the motor, electromagnetic means for holding said brake out of action and arranged to be energized from the motor circuit, a relay having its windings in the bridging circuit and a circuit controlled by the relay and including the electromagnetic switch.

In testimony whereof, I have hereunto set my hand, in the presence of two subscribing witnesses.

GEORGE S. TIFFANY.

Witnesses:
J. A. GRAVES,
T. F. KEHOE.